(12) United States Patent
Tsunemi et al.

(10) Patent No.: US 9,019,521 B2
(45) Date of Patent: Apr. 28, 2015

(54) DMA TRANSFER OF DATA

(71) Applicant: Canon Kabushiki Kaisha, Tokyo (JP)

(72) Inventors: Takuya Tsunemi, Tokyo (JP); Hiroki Horikoshi, Komae (JP); Shigeru Fujita, Yokohama (JP); Hideki Takemura, Tokyo (JP); Akira Ichimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/315,104

(22) Filed: Jun. 25, 2014

(65) Prior Publication Data

US 2015/0015905 A1 Jan. 15, 2015

(30) Foreign Application Priority Data

Jul. 11, 2013 (JP) ................. 2013-145840

(51) Int. Cl.
*G06F 15/00* (2006.01)
*G06F 3/12* (2006.01)
*B41J 2/07* (2006.01)
*G06K 15/02* (2006.01)

(52) U.S. Cl.
CPC .......... *G06F 3/1202* (2013.01); *B41J 2/07* (2013.01); *G06K 15/1803* (2013.01); *G06K 15/1817* (2013.01); *G06F 3/1294* (2013.01)

(58) Field of Classification Search
CPC .. B41J 25/34; B41J 2/195; G06K 2215/0077; G06K 15/024; G06K 15/10

USPC .......................... 358/1.13, 1.14, 1.1
See application file for complete search history.

(56) References Cited

U.S. PATENT DOCUMENTS

| 5,648,762 A | 7/1997 | Ichimura et al. |
| 5,963,713 A * | 10/1999 | Inose et al. ............ 358/1.4 |
| 6,708,234 B2 | 3/2004 | Moteki et al. |

FOREIGN PATENT DOCUMENTS

JP 2002-140288 A 5/2002

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

An apparatus comprising a first transfer unit configured to DMA-transfer input data to a holding unit, a second transfer unit configured to DMA-transfer the input data held by the holding unit to at least one unit, a notification unit configured to notify, in accordance with the DMA transferring of the first transfer unit, that the input data held by the holding unit is updated, and a transfer control unit configured to control so as to operate the second transfer unit in one of a first mode for transferring the input data from the holding unit to the at least one unit in response to the notification and a second mode for transferring the input data independently of the notification, wherein the transfer unit performs the switching to the second mode after the operation in the first mode.

15 Claims, 11 Drawing Sheets

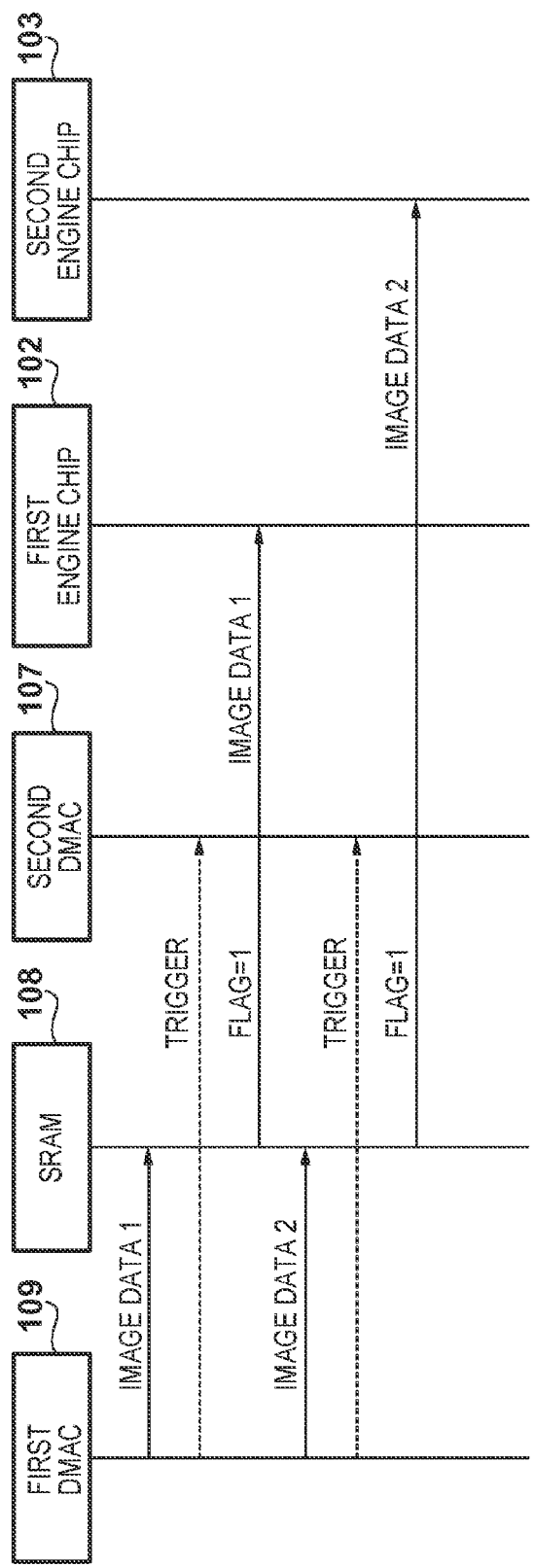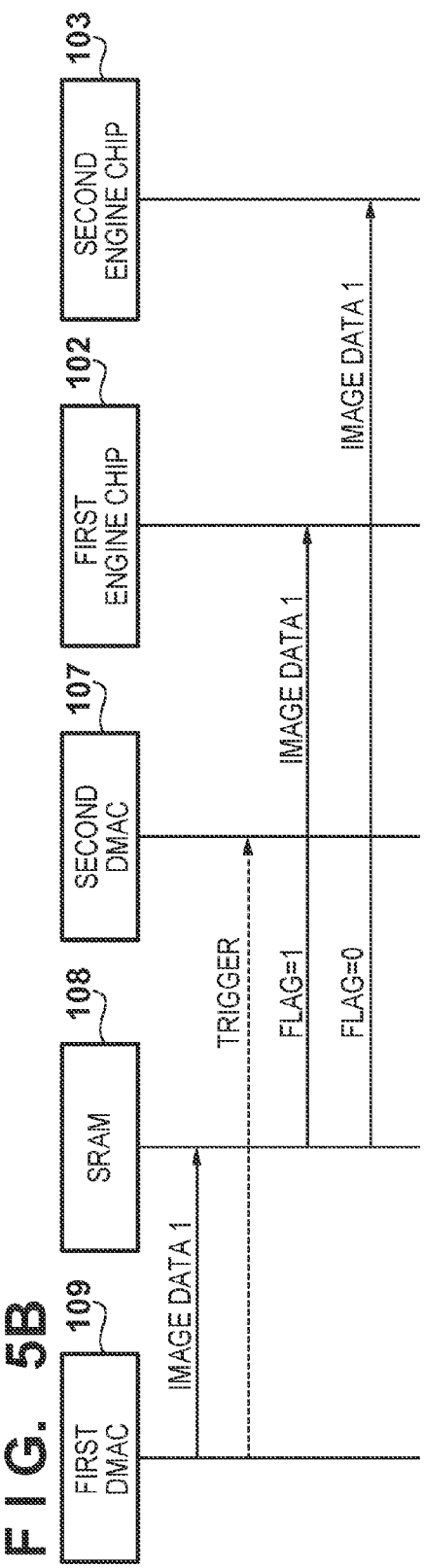

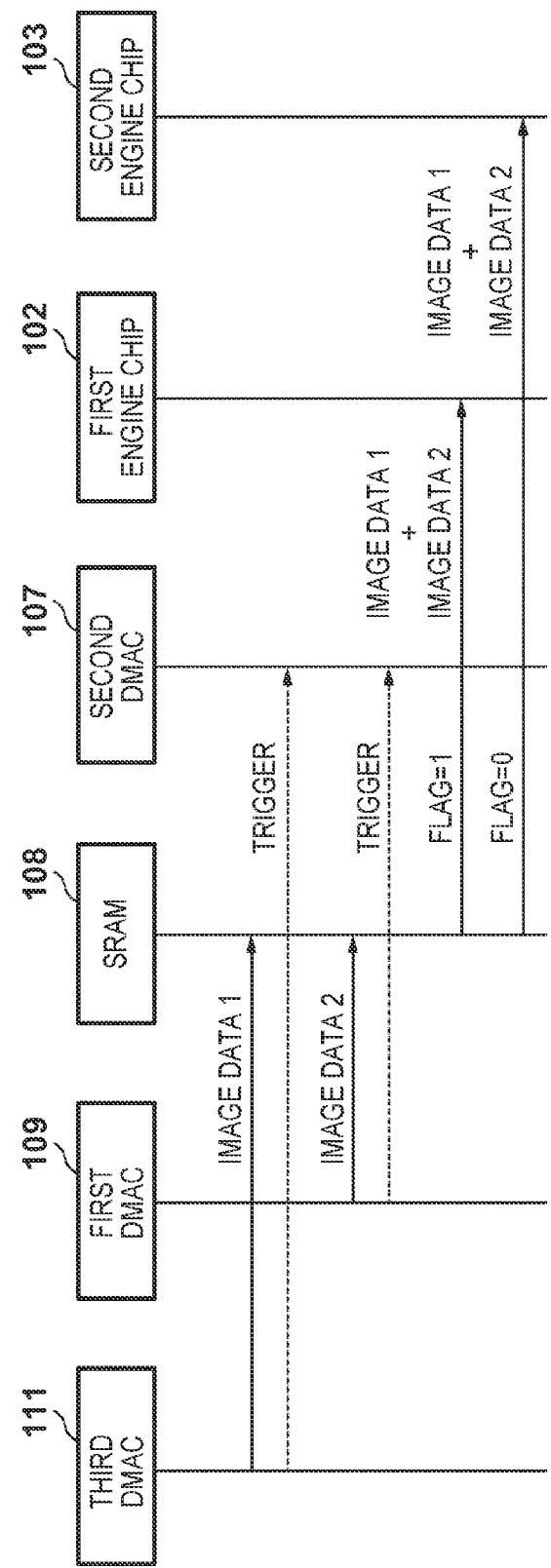

F I G. 10
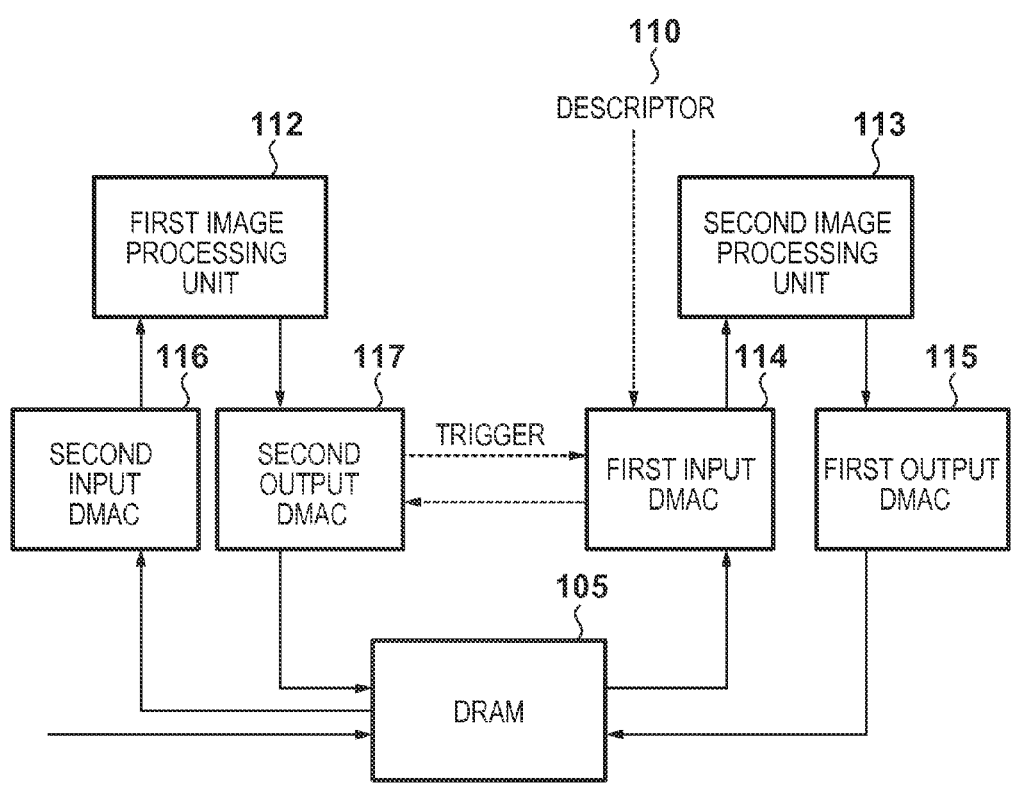

DMA TRANSFER OF DATA

BACKGROUND OF THE INVENTION

1. Field of the Invention

The present invention relates to an apparatus that performs data transfer by DMA transfer and a method.

2. Description of the Related Art

An image forming apparatus or printing apparatus such as a copying machine or printer includes a plurality of image processing modules, and causes these image processing modules to perform appropriate image processing according to a request for externally input image data. For example, image data is transferred between the image processing modules. Each image processing module sequentially analyzes the data and performs predetermined image processing. Desired image data is thus generated. For example, DMA (Direct Memory Access) transfer is used for data transfer. For example, input image data is temporarily stored in a temporary memory such as a DRAM. After that, the image data to be transferred is sequentially transferred in predetermined units by DMA transfer to an image processing module of a transfer destination.

Japanese Patent Laid-Open No. 2002-140288 discloses a method of switching DMA transfer target data by changing the information of a descriptor in accordance with specifications.

Even when image data is partially commonly used in a plurality of image processes, or image processing is performed in cooperation with a plurality of image processing modules, it is preferable to perform appropriate data transfer according to the contents of image processing and reduce the load on the CPU. In this case, information management is necessary to transfer common image data to the modules. In addition, cooperative operations may be needed among the CPU and the image processing modules to sequentially perform data transfer. However, when such information management or cooperation is achieved by only the descriptor, the load on the CPU increases, and the frequency of access to memories (DRAM and the like) becomes high. This may delay other signal processes and also delay the operation as a whole.

SUMMARY OF THE INVENTION

It is an object of the present invention to provide a technique advantageous in increasing the efficiency of data transfer.

One of the aspects of the present invention provides an apparatus, comprising a first transfer unit configured to DMA-transfer input data to a holding unit, a second transfer unit configured to DMA-transfer the input data held by the holding unit to at least one unit, a notification unit configured to notify, in accordance with the DMA transfer of the input data by the first transfer unit, that the input data held by the holding unit is updated, and a transfer control unit configured to control so as to operate the second transfer unit in one of a first mode in which the input data is transferred from the holding unit to the at least one unit in response to the notification from the notification unit and a second mode in which the input data is transferred from the holding unit to the at least one unit independently of the notification, wherein the transfer unit performs the switching to the second mode after the operation in the first mode.

Further features of the present invention will become apparent from the following description of exemplary embodiments with reference to the attached drawings.

BRIEF DESCRIPTION OF THE DRAWINGS

FIGS. 5A and 5B are sequence charts for explaining the operation of data transfer according to the first embodiment;

FIGS. 7A and 7B are sequence charts for explaining the operation of data transfer according to the second embodiment;

FIG. 10 is a block diagram for explaining data transfer according to the third embodiment.

DESCRIPTION OF THE EMBODIMENTS

First Embodiment

Figure 11A:
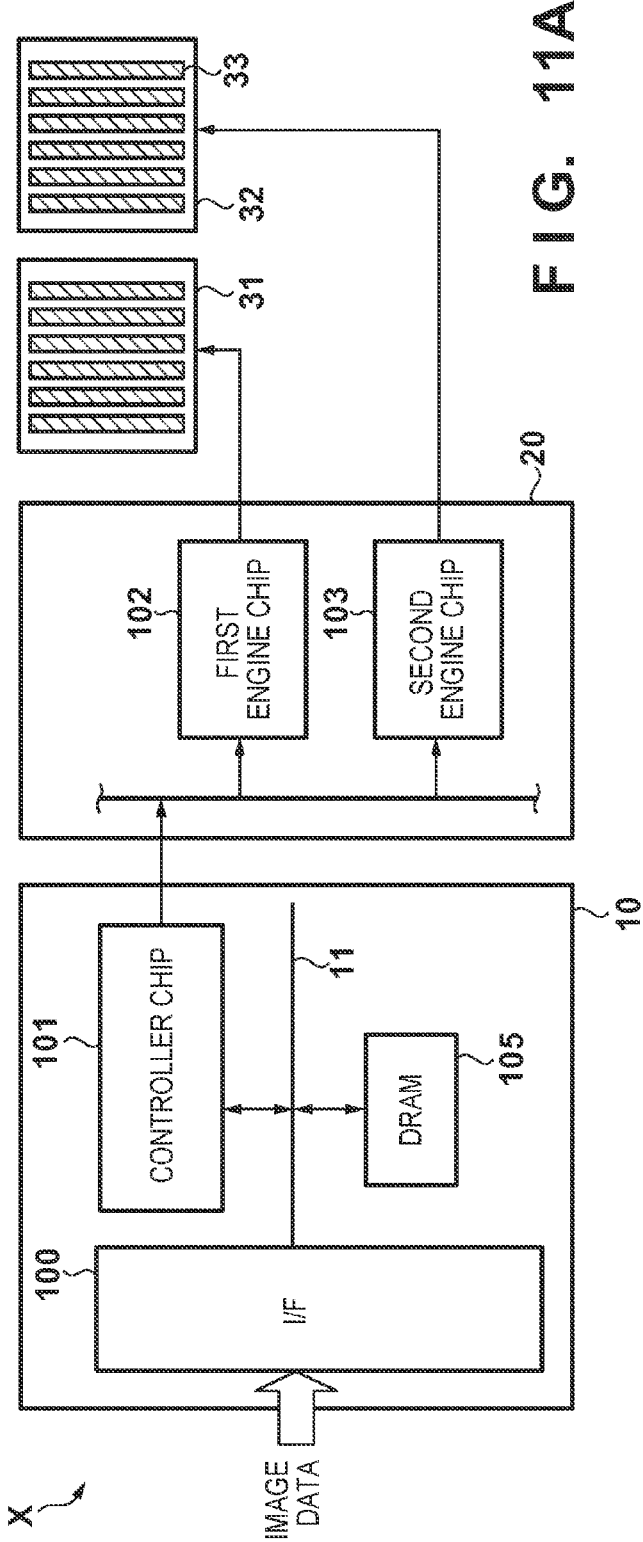
FIGS. 11A and 11B are views for explaining an example of the arrangement of a printing apparatus.

An example of the arrangement of an image forming apparatus or printing apparatus X (to be simply referred to as a "printing apparatus" hereinafter) such as a copying machine or printer will be described with reference to FIGS. 11A and 11B. As shown in FIG. 11A, the printing apparatus X includes a printer controller 10, a printer engine 20, and at least one printhead (printheads 31 and 32 here). The printer controller 10 stores image data (input data) input via a host interface 100 in a DRAM 105 via a bus 11, or causes a controller chip 101 to perform predetermined signal processing. The image data that has undergone the signal processing is output to the printer engine 20 and, for example, output in a data format to be printed by a printing method according to the arrangement of the printheads 31 and 32. This processing can be done by, for example, engine chips 102 and 103 that are units configured to control printing operations corresponding to the printheads 31 and 32, respectively.

Each of the printheads 31 and 32 includes printing element arrays 33 each including a plurality of printing elements arrayed. Six printing element arrays 33 are illustrated here. For example, the printhead 31 can perform color printing by, for example, causing the printing element arrays 33 to discharge printing materials (inks) of different colors under the control of the engine chip 102.

Figure 11B:
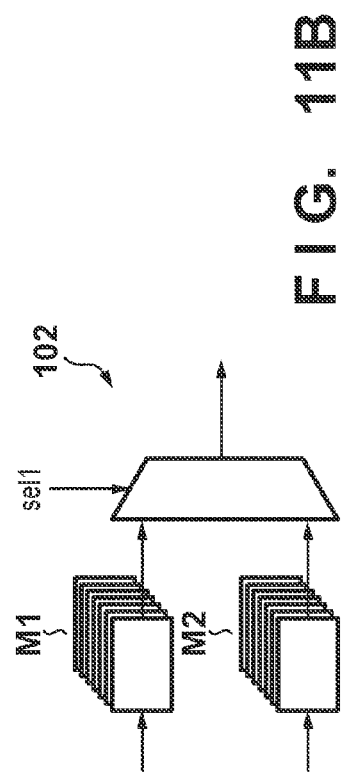

As shown in FIG. 11B, the engine chip 102 can include two memory groups (memory groups M1 and M2) corresponding to the printing element arrays 33. For example, the memory group M1 can store image data of six arrays to be used by the corresponding printing element arrays 33, respectively. The memory group M2 can store image data of six arrays to be used by the corresponding printing element arrays 33, respectively. For example, when image data to be printed is being transferred from one memory group (for example, memory group M1) to the printhead 31, image data to be printed next can be stored in the other memory group (for example, memory group M2). This may be done using a selection signal sell, as shown in FIG. 11B. A so-called double buffer structure is thus attained, which outputs image data to be printed, and in the meantime, prepares image data to be printed next. This also applies to the engine chip 103.

The printing apparatus X is a serial printer that prints an image by the raster method while making each printhead scan in a direction perpendicular to the array direction of the printing element arrays.

Figure 1:
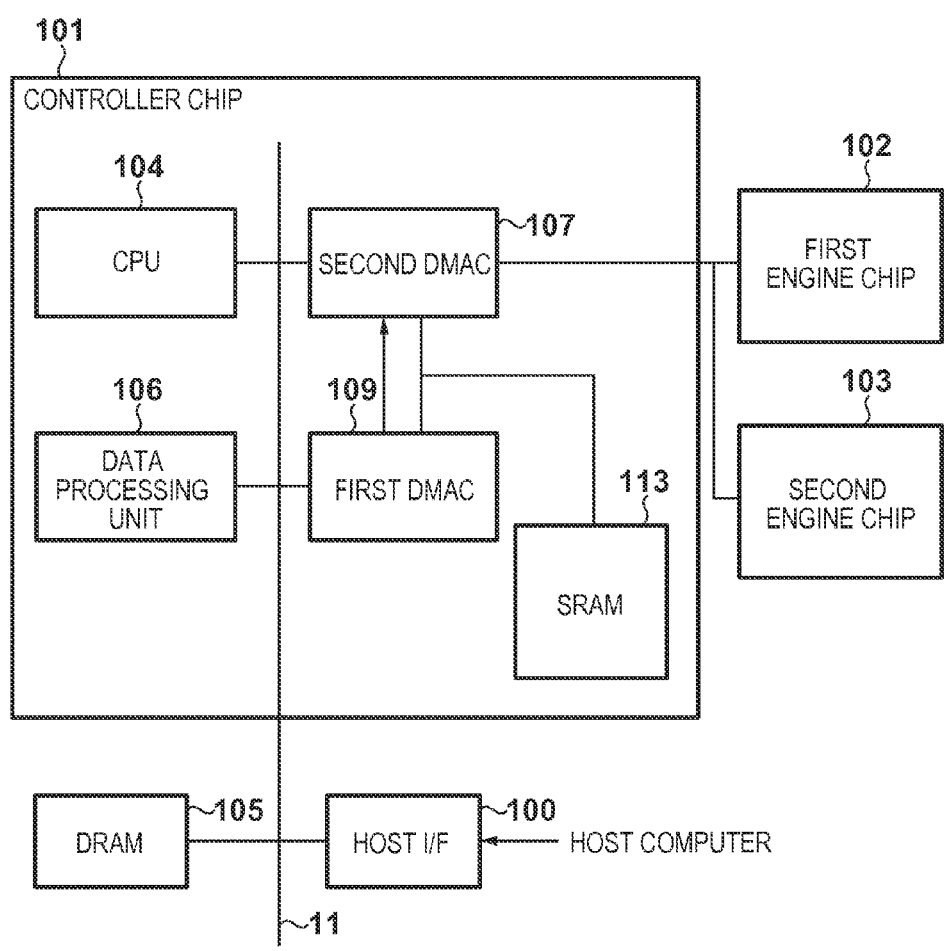
FIG. 1 is a block diagram for explaining an example of the arrangement of a system for performing data transfer.

The arrangement of a system for performing data transfer in the printing apparatus X will be described below with reference to FIG. 1. FIG. 1 illustrates the controller chip 101, the engine chips 102 and 103, the DRAM 105, and the host interface 100 of the printing apparatus X. For example, in the printing apparatus X according to this example, a print job and image data are output from a host computer (personal computer or the like) and input to the system via the host interface 100. They are connected via the system bus 11.

The image data includes data of respective colors (for example, red (R), green (G), and blue (B)). The controller chip 101 and the engine chips 102 and 103 perform data processing for the image data in accordance with the print job. The DRAM 105 is a general-purpose memory configured to temporarily store image data from the host computer and processed image data. The processed image data is output to the printhead 31 or 32. Discharge energy is generated to cause the printing elements provided in the printhead to discharge inks, thereby performing printing on a printing medium and forming an image on the printing medium.

The controller chip 101 includes a CPU 104, a data processing unit 106, a first DMAC 109, a second DMAC 107, and an SRAM 108. The CPU 104 performs information processing in accordance with programs stored in, for example, a ROM (not shown). The data processing unit 106 includes, for example, an image processing module (not shown), and performs data processing under printing conditions according to a print job. Data processing to be performed by the module includes, for example, color conversion processing, color correction processing, and binarization processing to be performed for multilevel data stored in the DRAM 105. The image data that has undergone these processes is then stored in the DRAM 105 again. The engine chips 102 and 103 perform various kinds of corresponding data processing by the same arrangement as that of the controller chip 101.

In this embodiment, consider the printing apparatus X that performs 10-color printing by the two printheads, each of which prints six colors, using common data for some colors. The engine chips 102 and 103 perform data processing in accordance with a mode (printing mode) of corresponding printing. Image data includes color data (cyan (C), magenta (M), yellow (Y), black (K), and the like), attribute data (data used to specify processing contents), and the like.

The controller chip 101 inputs, to the engine chips 102 and 103, information necessary to control printing (ink discharge) by the corresponding printheads. With the above-described double buffer structure, a predetermined unit of image data is alternately transferred from the controller chip 101 to the engine chips 102 and 103, which are operated parallelly to increase the efficiency of data processing. The engine chips 102 and 103 may use common (identical) image data depending on the printing mode. A case where, out of image data transferred to the engine chips 102 and 103, image data of two colors are common will be explained here.

Figure 2:
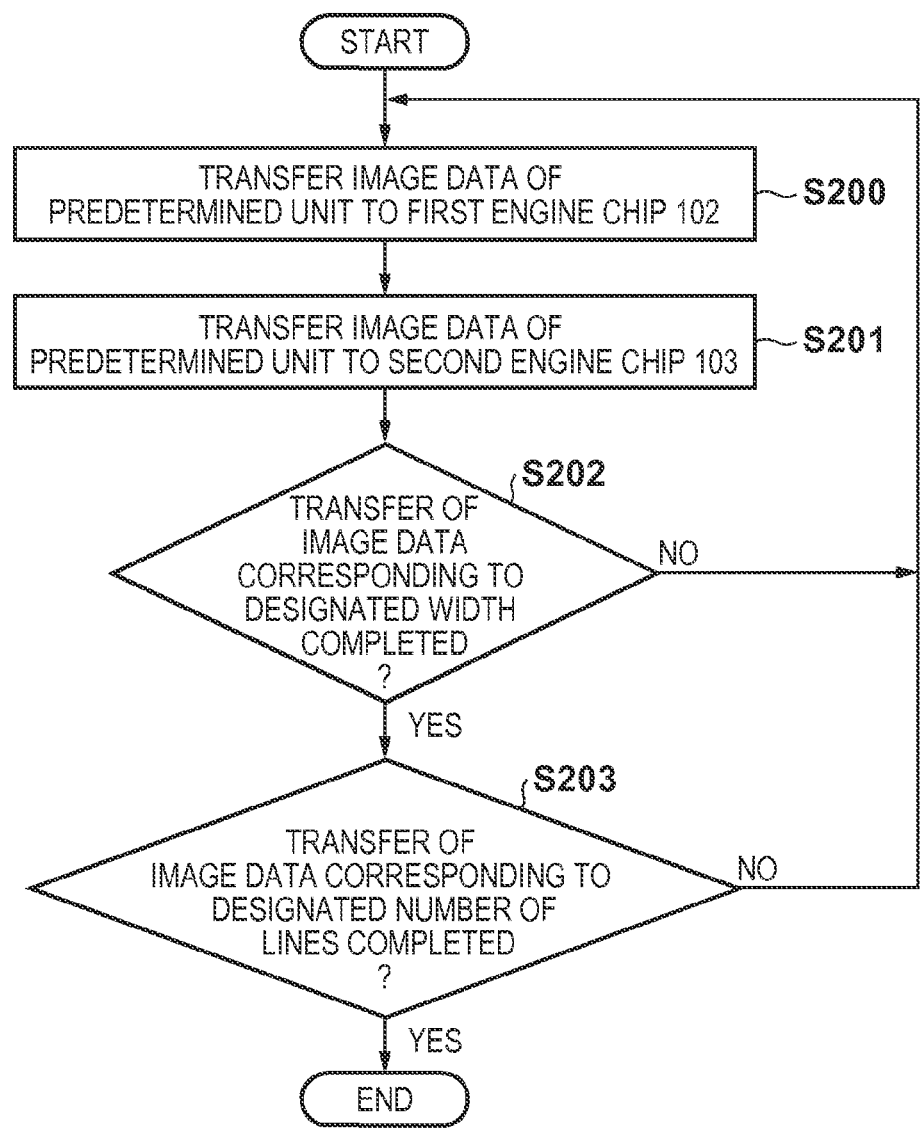
FIG. 2 is a flowchart for explaining data transfer according to the first embodiment.

FIG. 2 is a flowchart of data transfer according to this embodiment. When the CPU 104 starts data transfer, image data of an amount corresponding to the printing width of a printhead, for example, image data corresponding to one scanning cycle is transferred from the controller chip 101 to the engine chip 102 or 103 in accordance with this flowchart. The data transfer is done in a predetermined unit (for example, image data of 256×256 pixels) that is the unit to process data by the engine chip 102 or 103 at once.

In step S200, image data of the predetermined unit is transferred to the first engine chip 102. In this embodiment, data of six colors assigned to the first engine chip 102 are transferred. In step S201, image data of the predetermined unit is transferred to the second engine chip 103. In this embodiment, data of six colors (six arrays) assigned to the second engine chip 103 are transferred. Out of the image data of the total of 12 colors (12 arrays) transferred to the engine chips 102 and 103, image data of two colors are common. The common image data are transferred to the engine chips 102 and 103 in accordance with the printing mode. In this case, the transfer is done in the predetermined unit.

In step S202, the CPU determines whether the transfer is completed for image data of an amount designated in advance based on, for example, the width of the printing medium. If the data transfer is not completed, the data transfer of the predetermined unit is repetitively performed in accordance with steps S200 and S201.

In step S203, the CPU determines whether the transfer is completed for image data of an amount according to the designated number of lines. If the data transfer is not completed, the data transfer is repetitively performed in accordance with steps S200 to S202. In this way, data transfer of an amount corresponding to one scanning cycle of the printhead is performed. In the above description, data transfer is done by first performing transfer to the first engine chip 102 and then transfer to the second engine chip 103. However, the order is not limited to this.

Figure 3:
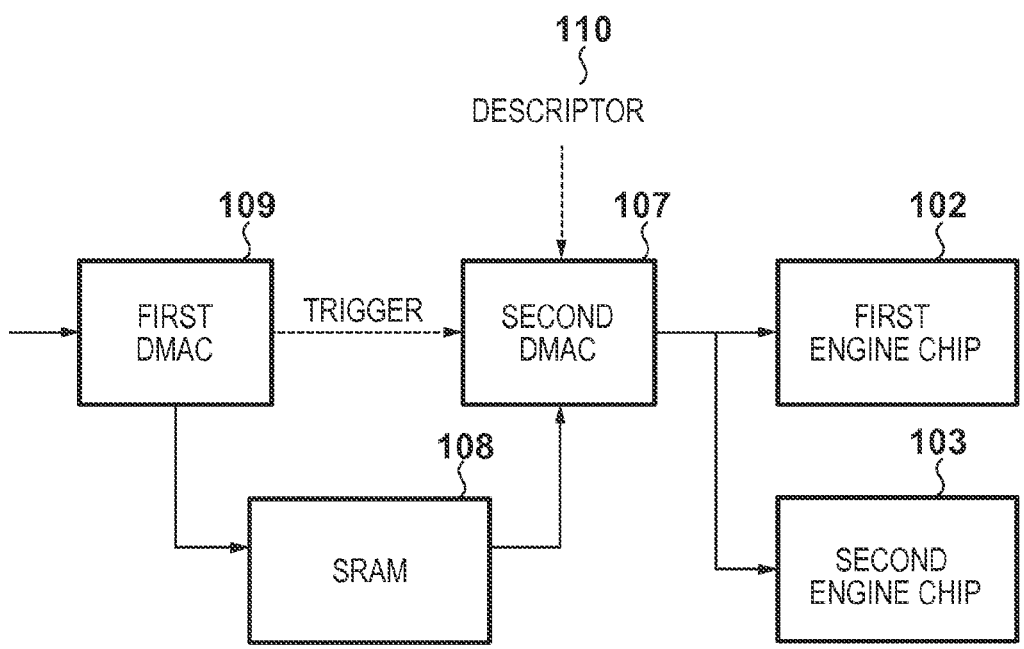
FIG. 3 is a block diagram for explaining data transfer according to the first embodiment.

As shown in FIG. 3, data transfer from the controller chip 101 to the engine chips 102 and 103 is performed by DMA transfer using the first DMAC 109, the second DMAC 107, and the SRAM 108. Data transfer is done in a predetermined unit under the control of the second DMAC 107. In the data transfer, image data to be transferred is read out from the DRAM 105 and temporarily held or stored in the SRAM 108 by the first DMAC 109 (first transfer).

After that, the second DMAC 107 transfers the stored image data to the first engine chip 102 or the second engine chip 103 (second transfer). The second DMAC 107 transfers image data stored in the SRAM 108 in accordance with a descriptor 110 that is information used to control the second DMAC 107. The descriptor 110 is generated by, for example, the CPU 104 and stored in the DRAM 105.

Figure 4:
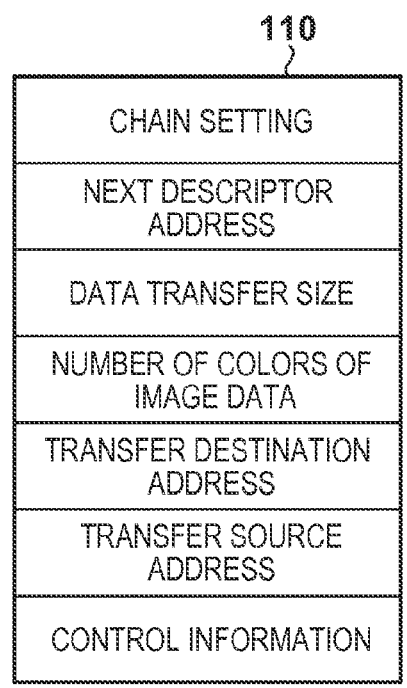
FIG. 4 is a view for explaining an example of a descriptor used for data transfer according to the first embodiment.

As shown in FIG. 4, the descriptor 110 has information (control information, transfer destination address of image data to be transferred, transfer source address, transfer size, and the like) necessary for data transfer. When a chain operation of repetitively performing data transfer is set, the start address (next descriptor address) of the descriptor 110, which should be referred to next for data transfer, can be included in the information. The information can include various kinds of information, for example, a plurality of kinds of information in accordance with the number of colors of image data and the like.

The second DMAC 107 can control its operation in accordance with one (flag) of the pieces of control information, for example, based on a trigger (notification) from the first DMAC 109. Here, the second DMAC 107 recognizes or determines, based on the trigger from the first DMAC 109, that image data to be transferred to the engine chip 102 or 103 is stored in the SRAM 108. That is, the second DMAC 107 can determine, by the trigger (transfer completion trigger), that the controller chip is ready for data transfer to the engine chip 102 or 103. The trigger can be one of conditions for the second DMAC 107 to start data transfer.

The descriptor 110 includes a flag used to decide or determine whether to set the trigger as the data transfer start condition. Note that whether to set the trigger as the data transfer start condition is decided in advance by the head or data assignment and the printing mode, and image data is stored in the memory in accordance with this setting. The CPU 104 creates the descriptor 110 based on this setting and sets the flag. When the trigger is set as the data transfer start condition, the second DMAC 107 transfers image data stored (updated) in the SRAM 108 by the first DMAC 109 to the engine chip 102 or 103 in response to the trigger. When the trigger is not set as the data transfer start condition, the second DMAC 107 repetitively transfers image data already stored in the SRAM 108 in accordance with the descriptor 110 without waiting for the trigger. In this way, the second DMAC 107 can switch the transfer mode based on the above-described trigger and the descriptor 110.

The sequence of data transfer will be described below with reference to FIGS. 5A and 5B. FIG. 5A shows a transfer mode in which the second DMAC 107 starts data transfer in response to the trigger based on the flag indicated by the descriptor 110 (when flag=1). That is, image data 1 read out from the DRAM 105 is stored in the SRAM 108 by the first DMAC 109. The second DMAC 107 starts transferring image data 1 to the engine chip 102 in response to the trigger according to the descriptor 110. Similarly, image data 2 read out from the DRAM 105 is stored in the SRAM 108. The second DMAC 107 starts transferring image data 2 to the engine chip 103 in response to the trigger according to the descriptor 110.

On the other hand, FIG. 5B shows a form in which switching is done, based on the flag indicated by the descriptor 110, between the mode (flag=1) in which the second DMAC 107 performs transfer in response to the trigger and a mode (flag=0) in which transfer is done independently of the trigger. In this case, the second DMAC 107 performs data transfer to the engine chip 103 independently of the trigger. The second DMAC 107 detects completion of transfer of image data 1 by the trigger, and starts transfer of image data 1 in accordance with the descriptor 110. When the flag of the descriptor 110 is disabled (flag=0), the second DMAC 107 repetitively transfers image data already stored in the SRAM 108 to the engine chip 103 in accordance with the descriptor 110 independently of the trigger.

As described above, the second DMAC 107 selects the operation mode in accordance with the descriptor 110, that is, selects whether to wait for a notification representing that image data to be transferred is updated in the SRAM 108, and performs DMA transfer in cooperation with the first DMAC 109. With the simple mechanism, this cooperation can cope with a variety of transfer sequences (number of colors of image data, number of common image data, how to assign image data, transfer order, and the like) according to the printing mode without complex sequence control. That is, the CPU 104 decides the period of switching the flag in accordance with the transfer sequence. This obviates the necessity of changing the configuration of the DMAC in accordance with image data to be transferred. The engine chips 102 and 103 and other units need only include at least one unit, and may appropriately change the configuration in accordance with the specifications independently of the number. When transferring image data to be commonly used in the engine chips 102 and 103, image data stored in the transfer source memory (DRAM 105 here) is read out only once, and so-called double read is unnecessary. The above-described image data transfer control can reduce the frequency of access to the DRAM 105 and improve the performance of the entire system. In addition, transfer can be performed at an arbitrary timing in response to a request from the engine chips 102 and 103.

In this embodiment, the arrangement that uses the SRAM 108 as the destination of DMA transfer by the second DMAC 107 has been described. However, the memory is not limited to an SRAM. In this embodiment, the arrangement that uses the first DMAC 109 as hardware to load image data to the SRAM 108 has been described. However, a processor that executes the above-described operation in cooperation with the second DMAC 107 may be used. In this embodiment, data transfer between a chip incorporating an image processing module and another chip has been described. However, data transfer is not limited to that between chips. For example, the transfer procedure of this embodiment is also applicable to data transfer between modules in a single chip. In addition, the numbers are not limited to those of this embodiment, and any arbitrary natural numbers are adoptable. For example, the number of colors to be printed by each printhead need not always be six, and the printing apparatus X need not always form a 10-color image.

Second Embodiment

Figure 6:
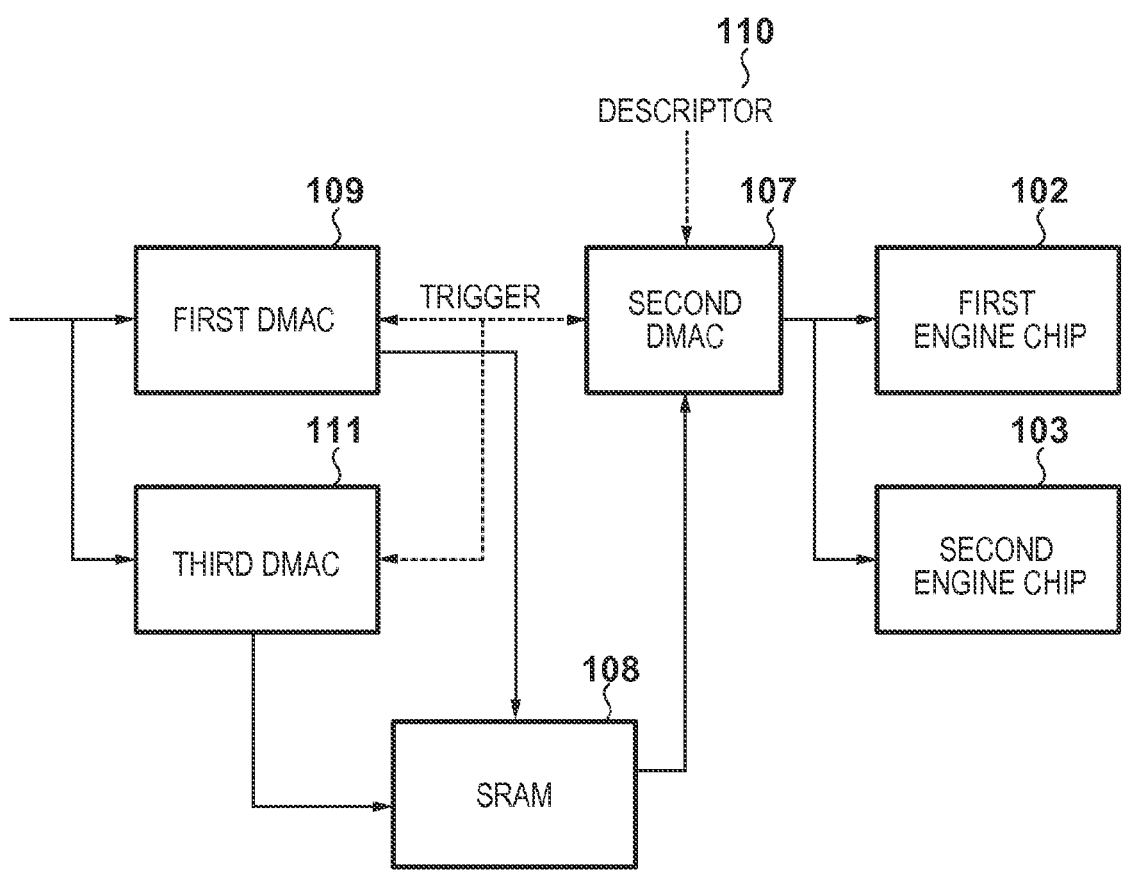
FIG. 6 is a block diagram for explaining data transfer according to the second embodiment.

A data transfer method according to the second embodiment will be described with reference to FIG. 6. This embodiment is different from the first embodiment in that first transfer is performed using not only a first DMAC 109 but also a third DMAC 111. A second DMAC 107 switches the data transfer mode by changing the data transfer start condition based on the above-described trigger and a descriptor 110, as in the first embodiment. In this embodiment, the third DMAC 111 is added to ensure performance of data transfer from a DRAM 105 to which two or more memory accesses can simultaneously be done. The second DMAC 107 recognizes or determines, based on two triggers from the first DMAC 109 and the third DMAC 111, that image data to be transferred to an engine chip 102 or 103 is stored in an SRAM 108.

When the trigger is set as the data transfer start condition, the second DMAC 107 transfers image data updated in the SRAM 108 to the engine chip 102 or 103 in response to the two triggers. When the trigger is not set as the data transfer start condition, the second DMAC 107 repetitively transfers image data already stored in the SRAM 108 in accordance with the descriptor 110 without waiting for any trigger. The SRAM 108 uses a double buffer structure.

The first DMAC 109 and the third DMAC 111 may be configured to start data transfer in response to an external trigger, like the second DMAC 107. This arrangement allows the first DMAC 109, the second DMAC 107, and the third DMAC 111 to perform data transfer in synchronism with each other.

Figure 7A:
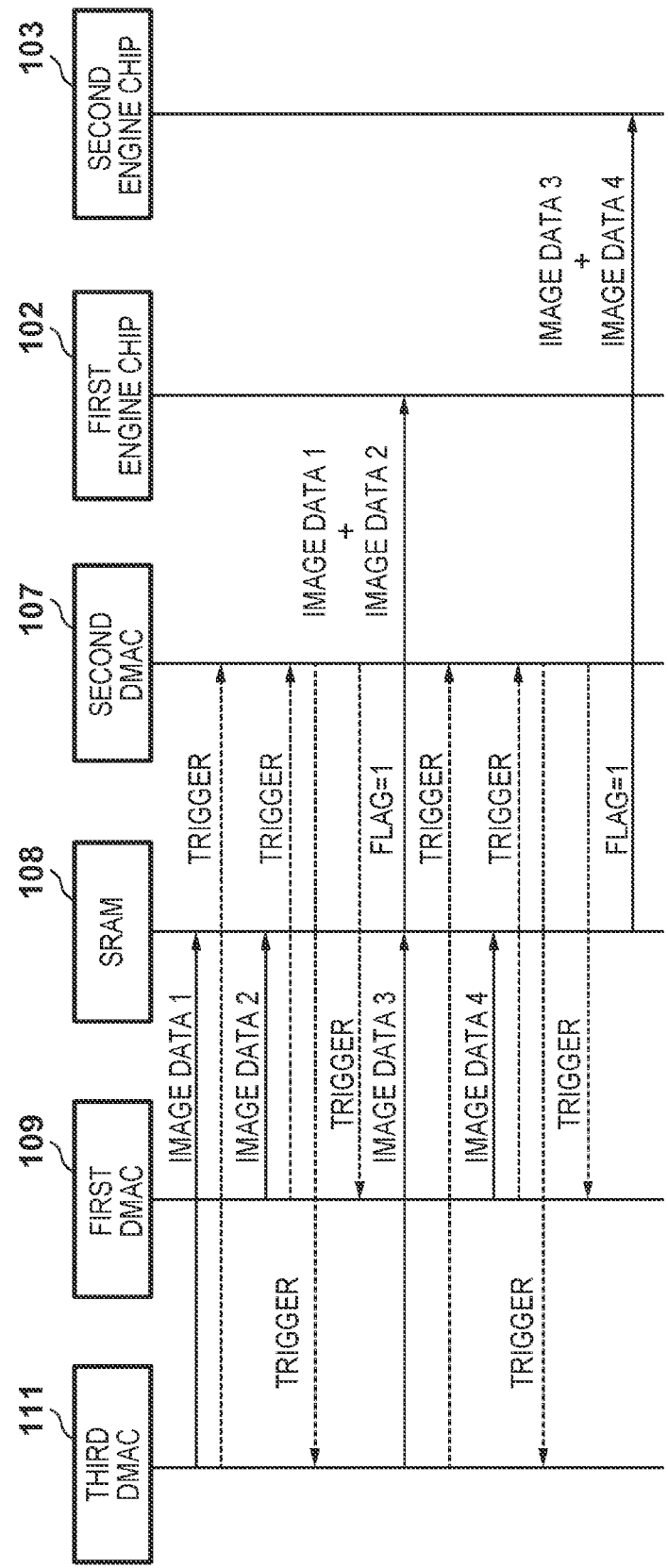

FIGS. 7A and 7B are sequence charts for explaining the sequence of data transfer. FIG. 7A shows a case where the second DMAC 107 starts data transfer in response to the two triggers based on the flag indicated by the descriptor 110 (when flag=1). That is, image data 1 read out from the DRAM 105 is stored in the SRAM 108 by the first DMAC 109, and the second DMAC 107 waits for a trigger corresponding to this. Similarly, image data 2 read out from the DRAM 105 is stored in the SRAM 108 by the third DMAC 111, and the second DMAC 107 waits for a trigger corresponding to this.

The second DMAC 107 starts transferring image data 1 and 2 to the engine chip 102 in response to the two triggers according to the descriptor 110. At the same time as the start of data transfer, the second DMAC 107 issues a trigger (transfer request trigger) to the first DMAC 109 and the third DMAC 111 to notify them that image data to be transferred next should be prepared by storing the image data in the SRAM 108 (second notification).

In response to this trigger, each of the first DMAC 109 and the third DMAC 111 starts transferring, to the SRAM 108, image data to be transferred next. The DMACs can independently operate. Hence, transfer of image data 1 and 2 to the engine chip 102 and transfer of image data 3 or 4 to the SRAM 108 are performed in parallel. After that, transfer of image data 3 and 4 to the engine chip 103 starts in accordance with the same procedure as described above.

On the other hand, FIG. 7B shows a form in which switching is done, based on the flag indicated by the descriptor 110, between the mode (flag=1) in which the second DMAC 107 performs transfer in response to the two triggers and a mode (flag=0) in which transfer is done independently of the triggers. In this case, the second DMAC 107 performs data transfer to the engine chip 103 independently of the triggers. The second DMAC 107 detects completion of transfer of image data 1 and 2 by the triggers, and starts transfer of image data 1 and 2. When the flag of the descriptor 110 is disabled (flag=0), the second DMAC 107 repeats data transfer to the engine chip 103 without issuing the transfer request trigger independently of the transfer completion trigger.

Figure 8:
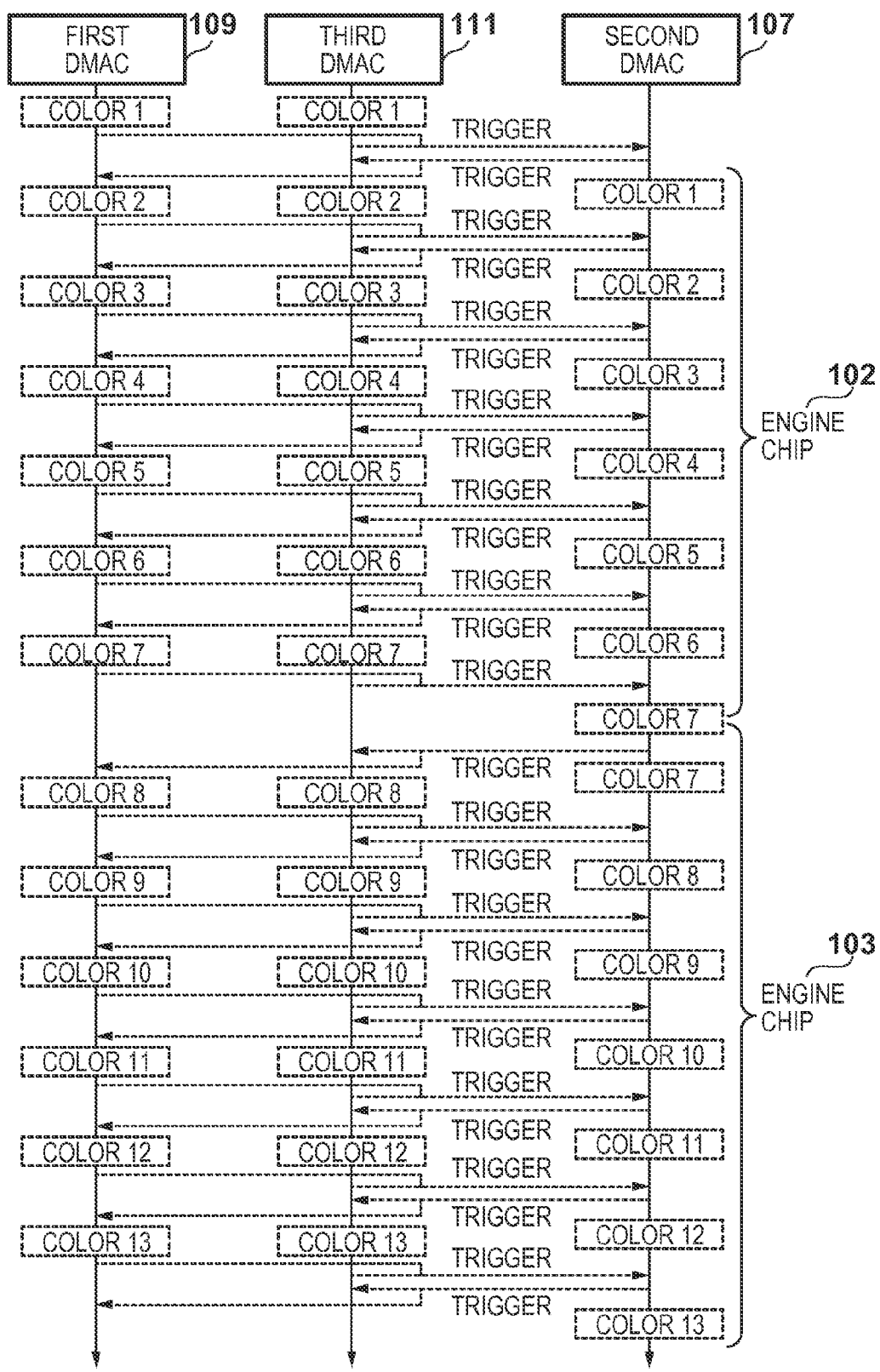
FIG. 8 is a sequence chart for explaining the sequence of data transfer according to the second embodiment.

FIG. 8 shows the sequence of data transfer by the DMACs according to this embodiment. A case where an input data group including image data (color data) of a plurality of types of colors (for example, BK, C, M, Y, PC, PM, R, G, B, GY, and the like) is transferred will be explained here. In particular, FIG. 8 illustrates a case where color data of seven colors are transferred to each of the engine chips 102 and 103, and one of the colors is commonly used in these chips. That is, in this example, the color data to be transferred correspond to 14 colors, and the number of types of colors is 13. Note that the amount of image data (image data 1, image data 2, ...) to be transferred is assumed to be ½ the image data of one color. First, image data of six colors (colors 1 to 6) are transferred to the engine chip 102. The image data of colors 1 to 6 are assumed to be used only in the engine chip 102.

Next, the first DMAC 109 and the third DMAC 111 prepare image data of color 7. The image data of color 7 is assumed to be commonly used in the engine chips 102 and 103. The second DMAC 107 first transfers the image data to the engine chip 102. At this time, the flag is set in the descriptor 110 such that the second DMAC 107 neither issues the transfer request trigger nor responds to the transfer completion trigger. After completing transfer of the data of color 7 to the engine chip 102, the second DMAC 107 starts transferring the data of color 7 to the engine chip 103.

After that, image data of next six colors (colors 8 to 13) are transferred to the engine chip 103. The image data of colors 8 to 13 are assumed to be used only in the engine chip 103. Data transfer of color 7 to be commonly used in the engine chips 102 and 103 is performed between the transfer processes for the chips, that is, between data transfer of colors 1 to 6 and data transfer of colors 8 to 13. As described above, the flag state is switched at a period of flag=1 for transfer of colors 1 to 6, flag=0 for color 7, and flag=1 for colors 8 to 13 in accordance with assignment to the engine chips. When data transfer is performed in this way, the memory size of the SRAM 108 for temporarily storing image data can be suppressed.

As described above, the second DMAC 107 selects the operation mode in accordance with the descriptor 110, that is, selects whether to wait for a notification representing that image data to be transferred is updated, and performs DMA transfer in cooperation with the first DMAC 109 and the third DMAC 111. With this embodiment, the same effects as in the first embodiment can be obtained. Although the above description has been made using color image data as data to be handled, the data need not always correspond to ink colors. For example, parameters, attribute data, and the like used in image processing are also possible as long as the data constitute image data. The arrangement in which two DMACs (first DMAC 109 and third DMAC 111) perform data transfer has been described above. However, three or more DMACs may be used, and the same effects as described above can be obtained.

Third Embodiment

Figure 9:
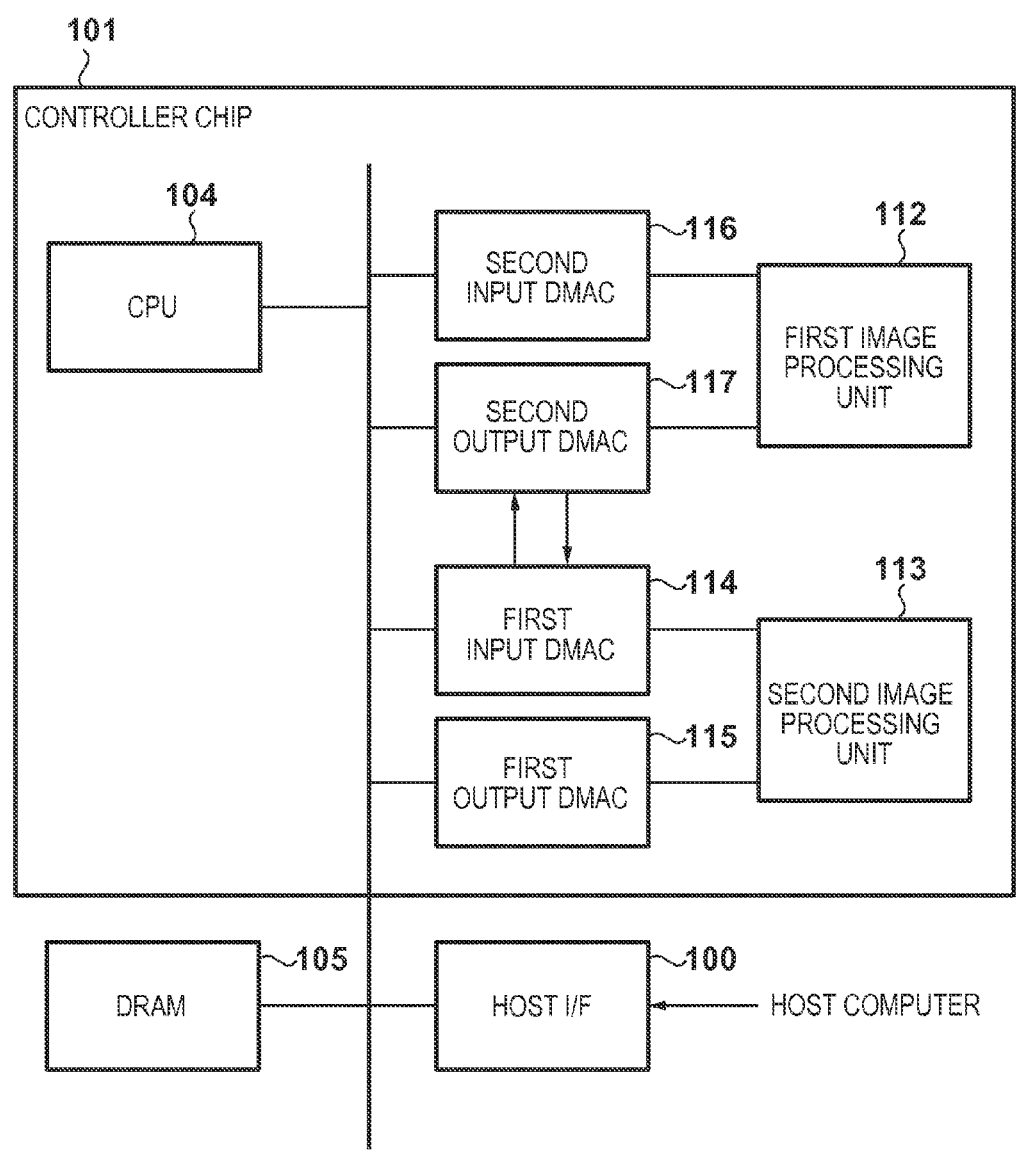
FIG. 9 is a block diagram for explaining an example of the arrangement of a system for performing data transfer according to the third embodiment.

In the first and second embodiments, data transfer between a chip incorporating an image processing module and another chip has been described. However, the transfer procedure is also applicable to data transfer between modules in a single chip. For example, the transfer procedure may be applied to an arrangement that returns image data to a single memory device in a single chip. Data transfer to be performed between two modules (first processing unit 112 and second processing unit 113) for performing image processing will be described with reference to FIG. 9. In this case, the system that implements data transfer is formed using a first input DMAC 114, a first output DMAC 115, a second input DMAC 116, and a second output DMAC 117. An explanation will be made below with focus placed on the operations of the first input DMAC 114 and the second output DMAC 117 which control data transfer between the modules.

A DMAC control method and a data flow in data transfer between the modules in a controller chip 101 will be described below with reference to FIG. 10. Image data input from a host computer is stored in a DRAM 105 and then processed by the first processing unit 112 and the second processing unit 113. The image data stored in the DRAM 105 is transferred to the first processing unit 112 by the second input DMAC 116 and processed.

After that, the image data that has undergone the data processing is stored in the DRAM 105 again by the second output DMAC 117. The image data stored in the DRAM 105 by the second output DMAC 117 is transferred to the second processing unit 113 by the first input DMAC 114 in accordance with a descriptor 110 and processed. After that, the image data that has undergone the data processing is stored in the DRAM 105 again by the first output DMAC 115.

The first input DMAC 114 switches the data transfer mode by changing the data transfer start condition based on the above-described trigger and the descriptor 110, as in the first embodiment. In this embodiment, the first input DMAC 114 recognizes or determines, based on the trigger from the second output DMAC 117, that image data to be transferred to the second processing unit 113 is stored in the DRAM 105.

The descriptor 110 includes a flag used to decide or determine whether to set the trigger as the data transfer start condition or set completion of immediately preceding transfer from the DRAM 105 to the second processing unit 113 as the data transfer start condition. When the trigger is set as the data transfer start condition, the first input DMAC 114 transfers image data stored (updated) in the DRAM 105 by the second output DMAC 117 to the second processing unit 113 in response to the trigger. When the trigger is not set as the data transfer start condition, the first input DMAC 114 repetitively transfers image data already stored in the DRAM 105 without waiting for the trigger.

In this way, the first input DMAC 114 can switch the transfer mode based on the above-described trigger and the descriptor 110. The second output DMAC 117 may be configured to start data transfer in response to an external trigger, as in the second embodiment. This allows the DMACs to perform data transfer between the modules in synchronism with each other.

As described above, the first input DMAC 114 selects the operation mode in accordance with the descriptor 110, that is, selects whether to wait for a notification representing that image data to be transferred is updated, and performs DMA transfer in cooperation with the second output DMAC 117. Hence, the same effects as in the first and second embodiments can be obtained even in data transfer between modules in a single chip, as described in this embodiment. In this embodiment, data transfer between two modules has been exemplified. However, the number of modules is not limited to this, and three or more modules are similarly usable.

The present invention is not limited to the above-described embodiments, and a change or combination can approximately be done in accordance with objects, states, application purposes, functions, or specifications. The present invention can also be implemented by other embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-145840, filed Jul. 11, 2013, which is hereby incorporated by reference herein in its entirety.

What is claimed is:

1. An apparatus comprising:
a first transfer unit configured to DMA-transfer input data to a holding unit;
a second transfer unit configured to DMA-transfer the input data held by the holding unit to at least one unit;
a notification unit configured to notify, in accordance with the DMA transfer of the input data by the first transfer unit, that the input data held by the holding unit is updated; and
a transfer control unit configured to control so as to operate the second transfer unit in one of a first mode in which the input data is transferred from the holding unit to the at least one unit in response to the notification from the notification unit and a second mode in which the input data is transferred from the holding unit to the at least one unit independently of the notification,
wherein the transfer control unit performs the switching to the second mode after the operation in the first mode.

2. The apparatus according to claim 1, wherein if the transfer control unit controls to perform the operation in the first mode, the second transfer unit transfers the input data to one unit, and
if the transfer control unit controls to perform the operation in the second mode after controlling to perform the operation in the first mode, the second transfer unit transfers the input data to another unit.

3. The apparatus according to claim 1, wherein the input data comprises input data that has undergone processing by a processing module, and
the at least one unit to which the second transfer unit DMA-transfers the input data held by the holding unit comprises another processing module configured to perform processing different from processing of the processing module.

4. The apparatus according to claim 1, further comprising a second notification unit configured to notify that the second transfer unit has started DMA transfer to the at least one unit, wherein the first transfer unit DMA-transfers next input data to the holding unit in response to the notification from the second notification unit.

5. The apparatus according to claim 4, wherein if the transfer control unit controls to perform the operation in the second mode, the second notification unit does not perform the notification.

6. The apparatus according to claim 1, wherein when the transfer control unit controls to perform the operation in the first mode, the second transfer unit transfers first input data from the holding unit to one unit in response to the notification from the notification unit, and transfers second input data from the holding unit to another unit in response to the notification from the notification unit.

7. The apparatus according to claim 1, wherein the transfer control unit controls to transfer the input data of a predetermined unit.

8. The apparatus according to claim 1, wherein DMA transfer of first input data by the second transfer unit and DMA transfer of second input data by the first transfer unit are performed in parallel.

9. The apparatus according to claim 1, further comprising:
a third transfer unit configured to DMA-transfer the input data to the holding unit; and
a third notification unit configured to notify, in accordance with the DMA transfer of the input data by the third transfer unit, that the input data held by the holding unit is updated,
wherein if the transfer control unit controls to perform the operation in the first mode, the second transfer unit transfers the input data DMA-transferred by the first transfer unit from the holding unit to the at least one unit in accordance with the notification from the notification unit, and transfers the input data DMA-transferred by the third transfer unit from the holding unit to the at least one unit in accordance with the notification from the third notification unit.

10. The apparatus according to claim 1, wherein the transfer control unit performs switching between the first mode and the second mode based on a flag setting.

11. The apparatus according to claim 1, further comprising the holding unit.

12. The apparatus according to claim 1, wherein the input data includes image data.

13. The apparatus according to claim 1, wherein the second transfer unit can DMA-transfer the input data held by the holding unit to at least two units, and
if input data groups each including a plurality of input data are to be transferred to the units, respectively, and the input data groups to be transferred to the different units include common input data, the transfer control unit controls so as to operate the second transfer unit in the second mode if performing data transfer of the common input data.

14. A printing apparatus comprising:
an apparatus of claim 13;

an Nth (N is a natural number: N≥1) printhead provided in correspondence with an Nth unit; and an (N+1)th printhead provided in correspondence with an (N+1)th unit, wherein the Nth printhead includes a plurality of printing element arrays corresponding to a plurality of types of data in the Nth unit, and the (N+1)th printhead includes a plurality of printing element arrays corresponding to a plurality of types of data in the (N+1)th unit.

15. A method of DMA-transferring input data to at least one unit, comprising:

DMA-transferring the input data to a holding unit;

DMA-transferring the input data held by the holding unit to the at least one unit; and notifying, in accordance with the DMA transfer of the input data in the DMA-transferring the input data to the holding unit, that the input data held by the holding unit is updated, wherein the DMA-transferring the input data to the at least one unit is executed in one of a first mode in which the input data is transferred from the holding unit to the at least one unit in response to the notification in the notifying and a second mode in which the input data is transferred from the holding unit to the at least one unit independently of the notification, and the switching to the second mode is performed after the operation in the first mode.

* * * * *